(12) United States Patent
Tozaka

(10) Patent No.: US 6,350,304 B1
(45) Date of Patent: Feb. 26, 2002

(54) BUILDING MATERIAL

(75) Inventor: Eisaku Tozaka, Kyoto (JP)

(73) Assignee: Topics Co., Ltd., Kyoto (JP)

( * ) Notice: Subject to any disclaimer, the term of this patent is extended or adjusted under 35 U.S.C. 154(b) by 0 days.

(21) Appl. No.: 09/674,324

(22) PCT Filed: Oct. 18, 1999

(86) PCT No.: PCT/JP99/05741

§ 371 Date: Oct. 30, 2000

§ 102(e) Date: Oct. 30, 2000

(87) PCT Pub. No.: WO00/79065

PCT Pub. Date: Dec. 28, 2000

(30) Foreign Application Priority Data

Jun. 10, 1999 (JP) ............................... 11-004383 U

(51) Int. Cl.$^7$ ............................................. C04B 24/00
(52) U.S. Cl. ................... 106/15.05; 106/724; 106/731; 106/732; 106/774; 106/823; 424/404; 424/408; 424/451; 424/452; 428/402.2
(58) Field of Search ............................. 106/15.05, 724, 106/731, 732, 774, 823; 424/404, 408, 451, 452; 428/402.2

(56) References Cited

U.S. PATENT DOCUMENTS 4,772,326 A * 9/1988 Heinen et al. ............... 501/111
5,164,096 A * 11/1992 Nunn ......................... 210/754
5,320,851 A * 6/1994 de Mars et al. ............. 424/451

FOREIGN PATENT DOCUMENTS

| JP | 63-205232 | | 8/1988 |
| JP | 63233031 | * | 9/1988 |
| JP | 3-33043 | | 2/1991 |
| JP | 05-132950 | | 5/1993 |
| JP | 06-065018 | | 3/1994 |
| JP | 06-184475 | | 7/1994 |
| JP | 07-243172 | | 9/1995 |
| JP | 08-267411 | | 10/1996 |
| JP | 11-012017 | | 1/1999 |

* cited by examiner

Primary Examiner—Paul Marcantoni
(74) Attorney, Agent, or Firm—Banner & Witcoff, Ltd.

(57) ABSTRACT

The construction material comprises a construction base material and microcapsules inside of which liquid containing hinokitiol is incorporated and a plurality of which are to be mixed into the construction base material and the liquid in the microcapsules transudes into the construction base material because the microcapsules collapse due to at least change with time.

6 Claims, 1 Drawing Sheet

BUILDING MATERIAL

FIELD OF THE ART

This invention relates to a construction material, more specifically to a construction material which constitutes walls or floors of a construction.

BACKGROUND ART

Conventionally concrete is sometimes used as a construction material in high-rise buildings or residential housings, etc. The concrete is used, for example, for a base in a single residential house or for floors or walls in high-rise buildings or apartment houses such as condominium. Then, in case of the apartment houses made of reinforced concrete interior materials made of wood-base such as plywood are used for walls or floors in order to improve comfortability.

However, the interior material uses a large amount of synthetic resin adhesive in a process of manufacturing the interior material as well as in applying the interior material. Within such synthetic resin adhesives, it is known that some kind of the synthetic resin adhesive diffuses a peculiar smell in indoors as well as diffuses some material which may affect human body in indoors.

In case of residential housings or apartment houses, since room temperatures can be adjusted without opening windows due to recent spread of air conditioning equipment, the windows are rarely left open, which decreases a chance of ventilating air of the room. And, an opening portion such as a window employs a window sash, which improves airtightness of the room, and an opening in windows or doorways decreases.

As a result, miscellaneous germs happen to survive throughout a long term once they propagate in walls and floors, etc. In this case, if an antibacterial agent is applied, it is not effective throughout a long term since there is a limit in an amount that the antibacterial agent can be applied, though it is effective for a while after applied. Therefore, there is a necessity of applying the antibacterial agent periodically, which requires time and labor. And, the above-mentioned peculiar odor is difficult to fade away, which might generate discomfort in a dairy life. Deodorant or fragrance might be used in order to deodorize such indoor odor, however, the deodorant effect lasts only for a short time or the deodorant ability is small in comparison with the indoor volume, resulting in failing to show the sufficient deodorant effect.

DISCLOSURE OF THE INVENTION

The object of the invention is to solve all of the above-mentioned problems.

In order to achieve this object, the invention takes the following means. The construction material in accordance with the invention is so made that a construction base material such as concrete or stucco is mixed with microcapsules inside of which liquid containing hinokitiol is incorporated and has such an arrangement that the microcapsules collapse due to at least change with time and the incorporated liquid transudes into the construction material base.

The invention is a construction material characterized by that comprising a construction base material and microcapsules inside of which liquid containing hinokitiol is incorporated and a plurality of which are to be mixed into the construction base material and that the liquid in the microcapsules transudes into the construction base material because the microcapsules collapse due to at least change with time.

In accordance with the arrangement, the microcapsules in the construction base material gradually collapse one by one as time goes by and the liquid containing the hinokitiol and incorporated in the collapsed microcapsule transudes into the construction base material. As a result, the liquid gradually spreads in whole of the construction base material according to collapse of the microcapsules. In other words, quite a large number of the microcapsules exist in the construction base material and a starting time when the microcapsule collapses varies. Therefore, collapse of the microcapsule is occurred continuously from a long term view and the liquid containing a little of the hinokitiol and incorporated in the microcapsule transudes gradually and continuously into the construction base material. Then since the liquid containing the hinokitiol exists in the construction base material for a long time, namely in a long term, an effect of antimicrobe, bacteria elimination, termite respelling, and deodorization that the hinokitiol possesses can be produced for a long time, resulting in saving a trouble of applying antibacterial agents.

As a construction base material concrete or stucco is represented. In case the construction base material is used, for example, in a residential house, the construction base material is used for a part which remains for a long time even if walls or floors are reconstructed. As a result, the effect of the hinokitiol can last throughout a long term.

The microcapsules are mixed with the construction base material at a volume of about 0.5 through 1 percent of a volume of the construction base material. With this mixing ratio, it is possible to secure enough volume which can produce an effect of the hinokitiol continuously for one construction material and to suppress a rise in the manufacturing cost, resulting in producing an effect of the hinokitiol with an improved cost performance. In the meantime, even though the microcapsules are mixed into the construction base material with a mixing ratio over the above ratio, the improvement in the effect according to the increase in the amount of the liquid containing the hinokitiol which is to transude into the construction base material can not be expected.

BEST MODES OF EMBODYING THE INVENTION

Figure 1:
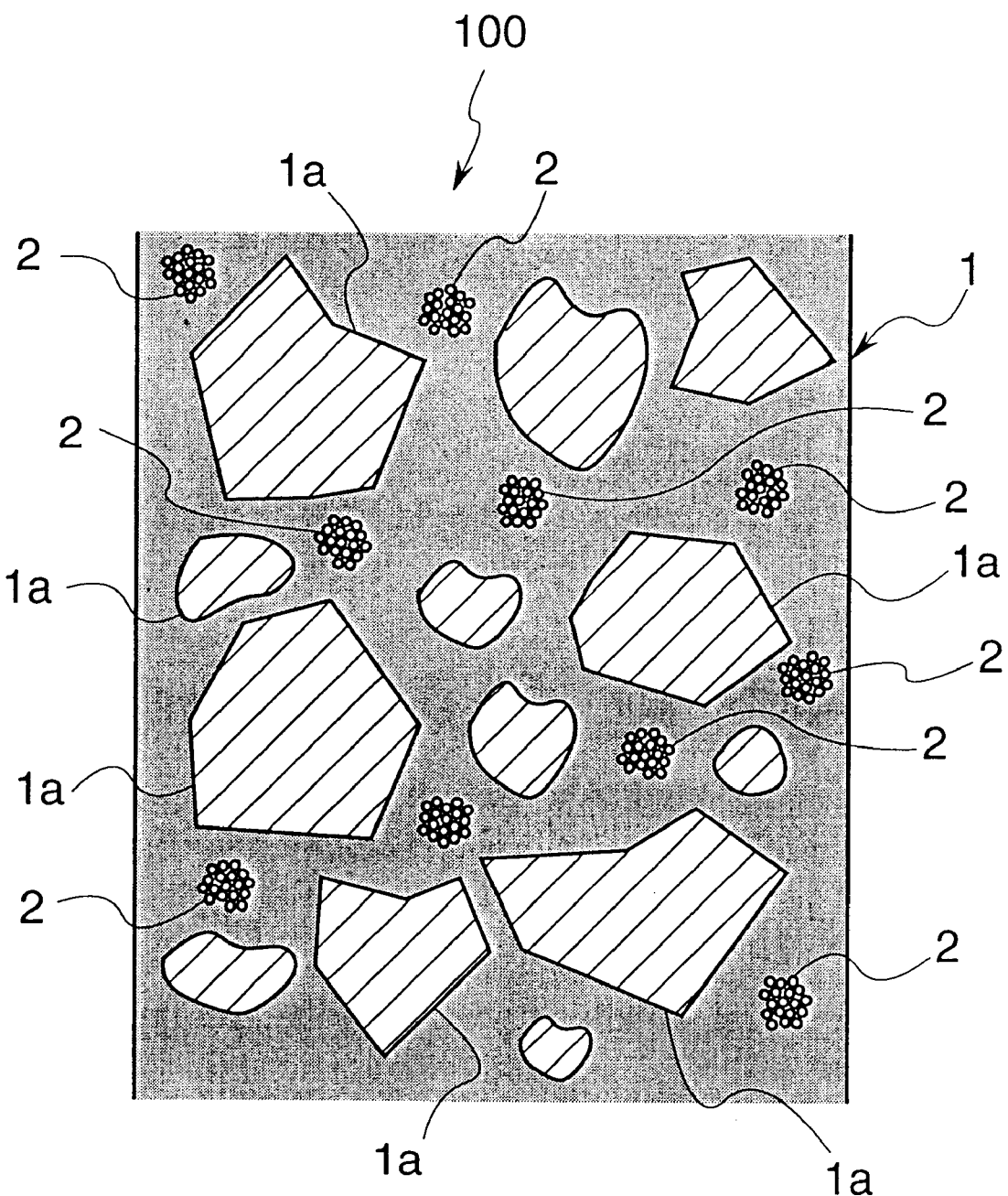
FIG. 1 is a cross-sectional view of a principle part showing one embodiment of the invention.

The invention will be described in detail with reference to the embodiments thereof shown in the accompanying drawings.

A construction material shown in FIG. 1 comprises concrete 1 as a construction base material and microcapsules 2 inside of which liquid containing hinokitiol is incorporated. The concrete 1 may be made of cement, rough aggregates 1a, fine aggregates and water with a variety of different mixing rates. Since each of the microcapsules 2 is extremely small in size compared with the rough aggregates 1a or the fine aggregates, the microcapsule 2 is shown in a magnified size in FIG. 1 to clarify the microcapsule 2. FIG. 1 shows a cross-sectional view of the construction material of the embodiment which is used for a wall.

The microcapsule 2 has a cover manufactured by a vegetable material of, for example, soybean protein, and liquid containing the hinokitiol which will be described hereinafter in detail is incorporated inside thereof. The size of the microcapsule 2 is preferably, for example, about 2 $\mu$m.

A solution containing the hinokitiol may be used as the liquid containing the hinokitiol of an aqueous solution extracted from the hinoki (Japanese cypress). The aqueous solution containing the hinokitiol is extracted by separating it from a solution containing a mix of oil and aqueous solution, obtained by directing high-pressure, high-temperature flow of steam at raw material comprised of hinoki chips, bark, branches or leaves, to fumigate the raw material, followed by rapid cooling and liquefaction of the steam containing the hinokitiol. The raw material comprised of wood fragments of hinoki is thus reduced to approximately sawdust-sized particles, which enhances extraction efficiency as by increasing the surface area of the overall supply of the raw material, namely, the area available for contact with the steam.

The solution extracted, namely, the undiluted extract, contains a mixture of oil and aqueous solution containing the hinokitiol. This undiluted extract is accumulated in a container used for extraction, the oil is separated, and the aqueous solution is separated from the oil and placed in a separate vessel to obtain an aqueous solution containing at least the hinokitiol. This aqueous solution may of course also contain other beneficial extracts apart from the hinokitiol.

Thus made microcapsules 2 are mixed with the concrete 1 with a ratio of the microcapsule 2 to the concrete 1 approximate 0.5 through 1 percent by volume while kneading the concrete 1. In this case, the microcapsules 2 are mixed into the concrete 1 at generally the same time when the rough aggregates 1a or the fine aggregates are mixed so as to knead the concrete 1. When the microcapsules 2 are placed into a mixer where the concrete 1 is mixed, the microcapsules 2 are in a state of a lump which is formed by several decade pieces to several hundred pieces of the microcapsules 2 being attracted each other. The microcapsules 2 which have been mixed with the concrete 1 are distributed generally even over the whole concrete 1 in a state of the lump inside of the hardened concrete 1. Then the construction material 100 is made, which comprises the concrete 1 and the microcapsules 2.

The above-described construction material 100 shows a bactericidal action whose test results are shown as follows. The trial of the antibacterial effect is conducted by hardening the concrete 1 into which the microcapsules 2 are mixed, smashing the concrete 1 after cured for about 1 month, soaking the smashed construction material 100 into phosphoric acid buffer solution at a proportion of 10 g of the construction material 100 to 50 ml of phosphoric acid buffer solution maintained at 35° C. and measuring populations of each bacteria adhered to the construction material 100 in every 24 hours. Table 1 shows a result of a trial conducted to evaluate the bactericidal ability and table 2 shows a results of a control experiment for comparison.

TABLE 1

(Results of trial)

| Bacterium | Start | 24 hours later −1 | 24 hours later −2 | 24 hours later −3 | Average |
|---|---|---|---|---|---|
| Escherichia coli | $4.1 \times 10^5$ | $1.8 \times 10^3$ | $2.0 \times 10^3$ | $2.1 \times 10^3$ | $2.0 \times 10^3$ |
| Staphylococcus aureus | $8.1 \times 10^5$ | 10 or less | 10 or less | 10 or less | 10 or less |
| Legionella pheumophila | $1.3 \times 10^5$ | $4.2 \times 10^4$ | $1.2 \times 10^4$ | $3.0 \times 10^4$ | $2.8 \times 10^4$ |

Unit: CFU/ml

TABLE 2

(Results of control experiment)

| Bacterium | Start | 24 hours later −1 | 24 hours later −2 | 24 hours later −3 | Average |
|---|---|---|---|---|---|
| Escherichia coli | $4.1 \times 10^5$ | $4.0 \times 10^5$ | $4.0 \times 10^5$ | $4.0 \times 10^5$ | $4.0 \times 10^5$ |
| Staphylococcus aureus | $8.1 \times 10^5$ | $8.0 \times 10^5$ | $8.0 \times 10^5$ | $8.0 \times 10^5$ | $8.0 \times 10^5$ |
| Legionella pheumophila | $1.3 \times 10^5$ | $1.1 \times 10^5$ | $1.1 \times 10^5$ | $1.1 \times 10^5$ | $1.1 \times 10^5$ |

Unit: CFU/ml

As is apparent from Table 1, bacteria populations of each types were confirmed to decrease with time and each bacteria was confirmed to be killed.

Thus arranged concrete 1 into which the microcapsules 2 are mixed is, for example, used for an apartment house such as condominium. In this case, since the microcapsules 2 are distributed into floors, walls and ceilings constituting a room of the apartment house, aroma of the hinokitiol always exists in the air. In addition, it can prevent a carpet laid on the floor from being infested with sticks due to the antibacterial effect. As a result, it can save a trouble of applying antibacterial agents.

In other words, the microcapsules 2 in the concrete 1 might get broken or damaged a little while the concrete 1 is kneaded, which makes liquid containing the hinokitiol infiltrate into tissue of the hardened concrete 1 from an initial stage so as to diffuse the aroma of the hinokitiol. On the while, since most of the microcapsules 2 exist in a state that the liquid containing the hinokitiol is incorporated therein, the diffused aroma is quite a little compared with an amount of the liquid in the microcapsules existing in the concrete 1.

The damaged microcapsules 2 break one by one in the early time and the liquid containing the hinokitiol transudes into the concrete 1. The microcapsules 2 which has not got damaged break due to change with time and the liquid containing the hinokitiol infiltrates into the concrete 1. As a result, liquid containing the hinokitiol infiltrates into the concrete 1 every time each of the microcapsules 2 is broken. Then the aroma of the hinokitiol is constantly diffused from inside of the concrete 1. As mentioned, since the liquid containing the hinokitiol and incorporated into the microcapsule 2 infiltrates gradually one by one due to collapse of the microcapsule 2, the aroma and the antibacterial action of the hinokitiol can be enjoyed constantly throughout a long term. In case that, for example, a base of a wooden house is made of the construction material 100, wooden parts such as the base can be prevented from harm of termites due to a characteristic of termite repelling. In addition, no matter how much the microcapsules 2 are collapsed, the amount of the liquid containing the hinokitiol which transudes into the concrete 1 is very small because the liquid is contained in the microcapsule 2. Therefore, it is as a whole micro-perfumed because of a small amount and it is possible to sufficiently demonstrate an effect which the hinokitiol possesses without stimulating residents.

In addition, since the microcapsules 2 are mixed with the concrete 1 at a volume of about 0.5 through 1 percent of a volume of the concrete 1, the strength of the concrete 1 is not influenced. As a result, the effect of the hinokitiol can be demonstrated to the maximum without causing deterioration of the concrete 1. In addition, there is no an extreme difference in the effect of the hinokitiol even if the microcapsules 2 are mixed over such volume ratio, resulting in high cost performance.

The invention is not limited to the above described embodiments.

In the above embodiment, it is explained that the construction base material is the concrete 1, however, it may be stucco or soil of a paint wall in a Japanesque house.

Further, oil liquid separated from extraction undiluted solution may be used as the liquid containing the hinokitiol.

Moreover, each of the arrangements is not limited to that illustrated in the figures and there may be various modifications without departing from the spirit and essential characteristics thereof.

Possible Applications in Industry

The construction material in accordance with the invention is good for antimicrobe, bacteria elimination, termite repelling, deodorization and suitable for walls or floors of residential houses or apartment houses, and for a base of wooden architectures.

What is claimed is:

1. A construction material characterized by that comprising a construction base material and microcapsules inside of which liquid containing hinokitiol is incorporated and a plurality of which are to be mixed into the construction base material and that the liquid in the microcapsules transudes into the construction base material because the microcapsules collapse due to at least change with time.

2. The construction material, described in claim 1 and characterized by that the microcapsules are mixed with the construction base material at a volume of about 0.5 through 1 percent of a volume of the construction base material.

3. The construction material, described in claim 1 and characterized by that the construction base material is concrete.

4. The construction material, described in claim 1 and characterized by that the construction base material is stucco.

5. The construction material, described in claim 2 and characterized by that the construction base material is concrete.

6. The construction material, described in claim 2 and characterized by that the construction base material is stucco.

* * * * *

UNITED STATES PATENT AND TRADEMARK OFFICE
CERTIFICATE OF CORRECTION

PATENT NO. : 6,350,304 B1
DATED : February 26, 2002
INVENTOR(S) : Eisaku Tozaka

It is certified that error appears in the above-identified patent and that said Letters Patent is hereby corrected as shown below:

Column 6,
Lines 3 through 30, delete claims 1 through 6 and insert

-- 1. A construction material comprising a construction base material and microcapsules having incorporated inside thereof a liquid containing hinokitiol wherein a plurality of the microcapsules are mixed into the construction base material and the liquid in the microcapsules transudes into the construction base material due to collapse of the microcapsules over time.

2. The construction material of claim 1 wherein the microcapsules are mixed with the construction base material at a volume of about 0.5 through 1 per cent of a volume of the construction base material.

3. The construction material of claim 1 wherein the construction base material is concrete.

4. The construction material of claim 1 wherein the construction base material is stucco.

5. The construction material of claim 2 wherein the construction base material is concrete.

6. The construction material of claim 2 wherein the construction base material is stucco. --.

Signed and Sealed this

Tenth Day of June, 2003

JAMES E. ROGAN
*Director of the United States Patent and Trademark Office*